US006328786B1

(12) United States Patent
Labasque et al.

(10) Patent No.: US 6,328,786 B1
(45) Date of Patent: Dec. 11, 2001

(54) PSA PROCESS USING AN ADSORBENT OF INTRINSIC STRENGTH FAVORABLE TO THE ADSORPTION KINETICS

(75) Inventors: Jacques Labasque, Versailles; Bernard Lledos, Guyancourt, both of (FR)

(73) Assignee: L'Air Liquide, Societe Anonyme pour l'Etude et l'Exploitation des Procedes Georges Claude, Paris Cedex (FR)

( * ) Notice: Subject to any disclaimer, the term of this patent is extended or adjusted under 35 U.S.C. 154(b) by 0 days.

(21) Appl. No.: 09/535,737

(22) Filed: Mar. 27, 2000

(30) Foreign Application Priority Data

Apr. 19, 1999 (FR) .................................................. 99 04885

(51) Int. Cl.$^7$ .................................................. B01D 53/047
(52) U.S. Cl. .................................. 95/96; 95/130; 95/902; 96/108
(58) Field of Search ............................... 95/96–105, 130, 95/902; 96/108

(56) References Cited

U.S. PATENT DOCUMENTS

| 3,140,933 | * | 7/1964 | McKee .................................... 95/130 |
| 4,481,018 | * | 11/1984 | Coe et al. ............................. 95/130 |
| 4,859,217 | * | 8/1989 | Chao ...................................... 95/130 |
| 5,152,813 | * | 10/1992 | Coe et al. ............................. 95/130 |
| 5,174,979 | * | 12/1992 | Chao et al. ........................... 423/715 |
| 5,203,887 | | 4/1993 | Toussaint ................................. 55/25 |
| 5,268,023 | * | 12/1993 | Kirner .................................... 95/103 |
| 5,419,891 | * | 5/1995 | Coe et al. ............................. 423/700 |
| 5,464,467 | * | 11/1995 | Fitch et al. ........................... 95/130 X |
| 5,658,370 | * | 8/1997 | Vigor et al. ........................... 95/130 X |
| 5,672,195 | * | 9/1997 | Moreau et al. ......................... 95/96 |
| 5,674,311 | * | 10/1997 | Notaro et al. ......................... 95/130 X |
| 5,698,013 | | 12/1997 | Chao ...................................... 96/108 |
| 5,779,767 | | 7/1998 | Golden et al. ......................... 95/96 |
| 5,868,818 | * | 2/1999 | Ogawa et al. ......................... 95/130 X |
| 5,912,422 | * | 6/1999 | Bomard et al. ....................... 95/130 X |
| 5,919,287 | * | 7/1999 | Moreau .................................. 95/130 |
| 5,922,107 | * | 7/1999 | Labasque et al. .................... 95/130 X |
| 5,962,358 | * | 10/1999 | Hees et al. ............................ 95/130 X |
| 6,022,397 | * | 2/2000 | Rouge et al. ......................... 95/130 X |
| 6,036,939 | * | 3/2000 | Funakoshi et al. ................... 95/130 X |
| 6,053,966 | * | 4/2000 | Moreau et al. ........................ 95/130 X |
| 6,068,678 | * | 5/2000 | Labasque et al. .................... 95/130 X |
| 6,083,301 | * | 7/2000 | Gary et al. ............................ 95/130 |
| 6,143,057 | * | 11/2000 | Bulow et al. ......................... 95/130 X |
| 6,146,447 | * | 11/2000 | Sircar et al. .......................... 95/130 X |
| 6,152,991 | * | 11/2000 | Ackley .................................. 95/130 X |
| 6,171,370 | * | 1/2001 | Hirano et al. ......................... 95/130 X |

FOREIGN PATENT DOCUMENTS

| 0589406 A | * | 3/1994 | (EP) . |
| 0 685 430 | | 12/1995 | (EP) . |
| 0 769 320 | | 4/1997 | (EP) . |
| 0 785 020 | | 7/1997 | (EP) . |

* cited by examiner

Primary Examiner—Robert H. Spitzer
(74) Attorney, Agent, or Firm—Young & Thompson

(57) ABSTRACT

A PSA, especially VSA, process for separating a stream of gas, such as air, containing at least one first compound, such as nitrogen, which is preferentially adsorbed on at least one adsorbent and at least one second compound, such as oxygen, which is adsorbed less preferentially on the adsorbent than the first compound. The adsorbent comprises at least particles of a zeolite having a Si/Al ratio of less than or equal to 5 and chosen from zeolites of X or A type, the zeolite having a kinetics coefficient ($a_k$) and an intrinsic strength ($\alpha$), with: $a_k > 0.5$ s$^{-1}$ and $0.10 < \alpha < 2$. The invention also relates to an adsorbent for the non-cryogenic separation of gases, especially the gases from air and from syngas.

16 Claims, 2 Drawing Sheets

PSA PROCESS USING AN ADSORBENT OF INTRINSIC STRENGTH FAVORABLE TO THE ADSORPTION KINETICS

FIELD OF THE INVENTION

The invention relates to a PSA-type, and more particularly a VSA-type, process for separating a stream of gas, particularly a stream of gas such as air, using an adsorbent having an intrinsic strength favourable to the adsorption kinetics.

BACKGROUND OF THE INVENTION

It is known that gases in air, especially oxygen, are of great industrial importance because of their many applications in very varied technical fields.

At the present time, the cyclic adsorption technique called "PSA" (short for Pressure Swing Adsorption) is widely used for producing these gases.

More specifically, when the gas mixture to be separated is air and the component to be recovered is oxygen, the oxygen is separated from the gas mixture by virtue of a preferential adsorption of at least the nitrogen on a material that preferentially adsorbs nitrogen.

This nitrogen adsorption is achieved by varying the pressure applied in the separation zone containing the adsorbent material.

The oxygen, since it is not adsorbed or only slightly, is recovered at the outlet of the separation zone, with a purity, in general, greater than 90% or even 93% or higher.

More generally, a PSA process for separating a gas mixture comprising a first compound which is preferentially adsorbed on an adsorbent material and a second compound which is adsorbed less preferentially on the adsorbent material than the first compound, for the purpose of producing the second compound, comprises, in a cyclic manner:

- a step of preferential adsorption of at least the first compound on the adsorbent material, at an adsorption pressure called the "high pressure", with recovery of at least one portion of the second compound thus produced;
- a step of desorption of the first compound thus trapped by the adsorbent, at a desorption pressure, called the "low pressure", which is less than the adsorption pressure;
- a step of repressurization of the separation zone comprising the adsorbent, by gradually increasing the pressure from the low pressure to the high pressure.

However, it is known that the efficiency with which a gas mixture, such as air, is separated depends on many parameters, especially the high pressure, the low pressure, the type of adsorbent material used and the affinity of the latter for the compounds to be separated, the composition of the gas mixture to be separated, the adsorption temperature of the mixture to be separated, the size and shape of the particles of adsorbent, the composition of these particles and the temperature range being established within the bed of adsorbent.

At the present time, although no general law governing the behaviour has been able to be determined, knowing that it is very difficult to link these various parameters together, it is also known that the nature and the properties of the adsorbent play a paramount role in the overall efficiency of PSA-type processes.

At the present time, zeolites, especially of the A, X, Y or LSX (Low Silica X) type, are the adsorbents most commonly employed in PSA processes.

The zeolite particles usually contain monovalent, divalent and/or trivalent cations, for example cations of alkali metals, of alkaline-earth metals or of lanthanides, these cations being incorporated during the synthesis of the zeolite particles and/or inserted subsequently using an ion-exchange technique as described in the prior art.

Conventionally, the adsorbents most used for the separation of gases, particularly air, are zeolites which are highly exchanged, generally to more than 80%, with metal cations, such as lithium, calcium, strontium, barium, aluminium, zinc or copper cations. In this regard, mention may be made, as examples, of documents U.S. Pat. No. 5,268,023, U.S. Pat. No. 5,174,979, U.S. Pat. No. 4,859,217, U.S. Pat. No. 5,152,813, U.S. Pat. No. 4,481,018, U.S. Pat. No. 5,419,891, EP-A-589,406 and EP-A-589,391.

However, the productivity of a PSA unit depends also on other parameters, especially such as the cycle time.

This is because, in order to increase the productivity of a PSA unit with one or more adsorbers, that is to say to produce more gas, for example oxygen, during a given time period, the cycle time of each of the adsorbers of the unit must be reduced.

To do this, it is necessary to use an adsorbent having sufficiently rapid adsorption kinetics, as described by the document EP-A-785,020. Thus, in order to improve the adsorben: particle kinetics, it is known to be desirable to reduce their hydraulic diameter, which in turn causes, moreover, a pressure drop within the beds of adsorbents to be increased.

Now, reducing the hydraulic diameter of the particles also results in a reduction in their mechanical strength.

Thus, since the adsorbent particles are more brittle they are crushed more easily.

Furthermore, if the strength of the adsorbent particles is too high, deterioration of the kinetics of the molecular sieve may occur.

OBJECTS OF THE INVENTION

The object of the present invention is therefore to solve the aforementioned problem by proposing a PSA process using adsorbent particles whose hydraulic diameter allows fast adsorption kinetics and whose intrinsic strength, given this diameter, allows sufficient mechanical strength.

The object of the present invention is therefore to propose a PSA process using an adsorbent having rapid kinetics and intrinsic strength sufficient to be acceptable from the industrial standpoint, especially during the non-cryogenic separation of the gases from air.

SUMMARY OF THE INVENTION

The present invention therefore relates to a PSA, preferably VSA, process for separating a stream of gas containing at least one first compound which is preferentially adsorbed on at least one adsorbent and at least one second compound which is adsorbed less preferentially on at least the adsorbent than the first compound, in which process the adsorbent comprises at least particles of a zeolite having a Si/Al ratio of less than or equal to 5 and chosen from faujasite-type zeolites with a FAU structure, especially X-type or Y-type zeolites, or with a LTA structure, such as A-type zeolites, the zeolite having a kinetics coefficient ($a_k$) and an intrinsic strength ($\alpha$), with: $a_k > 0.5$ $s^{-1}$ and $0.10 < \alpha < 2$.

The parameter $a_k$ denoting the adsorption kinetics is defined, for example, in document U.S. Pat. No. 5,672,195 (EP-A-785,020) incorporated here by way of reference.

Depending on the case, the process of the invention may comprise one or more of the following characteristics:

the intrinsic strength ($\alpha$) is greater than 0.15, preferably greater than 0.20;

the intrinsic strength ($\alpha$) is less than 1.5, preferably less than 1;

the zeolite is a zeolite having a faujasite structure with a Si/Al ratio of 1 to 1.25, preferably a LSX-type zeolite with a Si/Al ratio of about 1.02±0.02;

the zeolite is exchanged by monovalent, divalent and/or trivalent cations, preferably lithium, potassium, calcium, zinc, copper, aluminium, strontium or nickel cations;

the zeolite contains from 30 to 99% lithium and/or calcium cations;

the zeolite contains from 80 to 99% lithium cations and/or from 0.1 to 10% potassium cations, preferably from 90 to 99% lithium cations;

the stream of gas to be separated comprises oxygen and nitrogen and preferably the stream of gas is a stream of air, the air being, within the context of the present invention, the air contained inside a building or a heated or unheated enclosure, or the outside air, that is to say under atmospheric conditions, taken as it is or optionally pretreated, especially dried;

the first compound is nitrogen and the second compound is oxygen, and a stream of oxygen-rich gas, that is to say comprising, in general, at least 90% oxygen, is produced;

the stream of gas to be separated comprises at least one of the compounds chosen from CO, $CO_2$, hydrogen and mixtures thereof, and/or at least one other gas more polar than hydrogen;

the high adsorption pressure is between $10^5$ Pa and $10^7$ Pa, preferably about $10^5$ Pa to $10^6$ Pa, and/or the low desorption pressure is between $10^4$ Pa and $10^6$ Pa, preferably about $10^4$ Pa to $10^5$ Pa.

the feed temperature is between 10° C. and 80° C., preferably between 25° C. and 60° C.

The process of the invention may be carried out in any conventional PSA apparatus, comprising at least one adsorber and preferably from 1 to 3 adsorbers.

According to another aspect, the invention also relates to an adsorbent for the separation of gases, comprising at least particles of a zeohite having a Si/Al ratio of less than or equal to 5 and chosen from zeolites of X or A type, the zeolite having a kinetics coefficient ($a_k$) and an intrinsic strength ($\alpha$), with: $a_k>0.5$ s$^{-1}$ and $0.10<\alpha<2$ or, preferably, $0.20<\alpha<1$.

BRIEF DESCRIPTION OF THE DRAWINGS

The invention will now be more clearly understood by virtue of the following detailed description and with reference to the appended figures.

DETAILED DESCRIPTION OF THE INVENTION

The adsorption kinetics of a molecular sieve may be represented by the parameter $a_k$, as described in the document U.S. Pat. No. 5,672,195 or by the document *Pressure Swing Adsorption*, Ruthven, VCH, 1994, p.181.

In general, when the limiting phenomenon is the diffusion of gas molecules through the macropores of the molecular sieve, then:

$$a_k = k/d^2 \tag{1}$$

where:

$a_k$ is the kinetics coefficient expressed in s$^{-1}$, k is the intrinsic kinetics of the adsorbent material expressed in m$^2 \cdot$s$^{-1}$;

d is the hydraulic diameter of the particles expressed in m.

In fact, the practical determination of the parameter $a_k$ is based on an analysis of the dynamic response of the molecular sieve, that is to say of the adsorbent tested.

This dynamic response is derived from the breakthrough curve for an $O_2/N_2$ gas mixture through a column initially filled with oxygen. The stream of feed gas is at a constant flow rate and a constant pressure and a gas tracer is used to be able to monitor the breakthrough.

Figure 1:
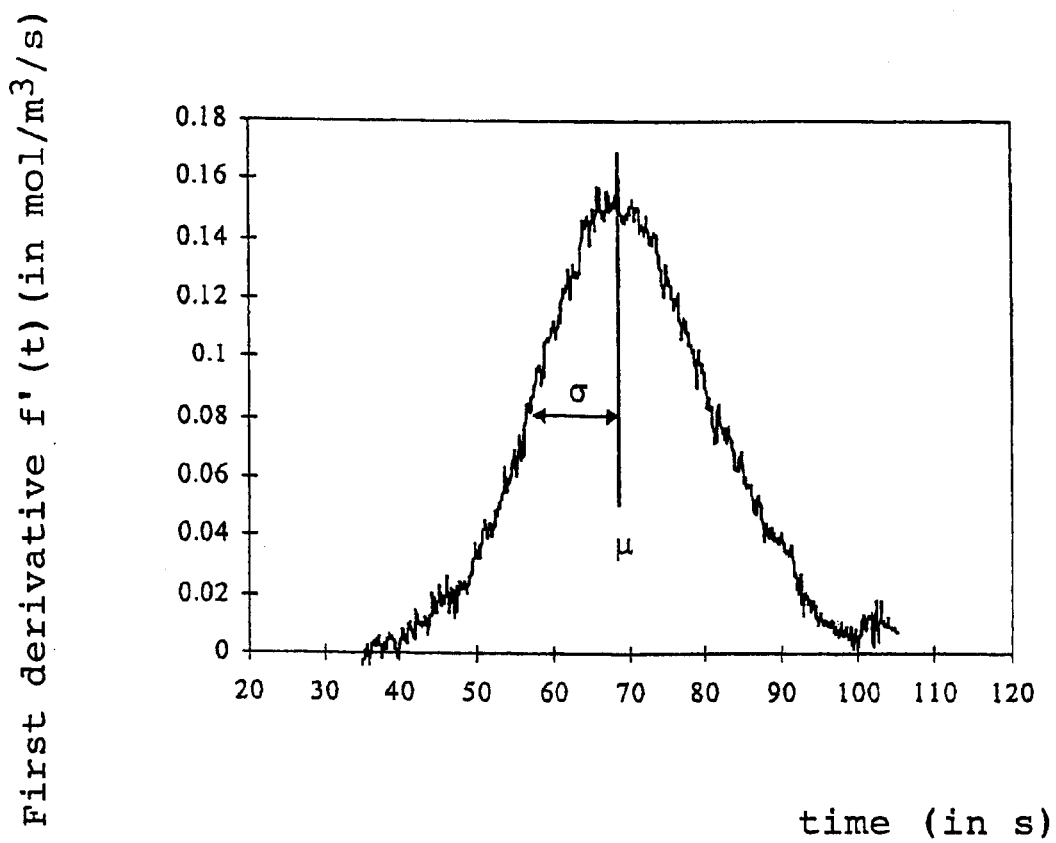
FIG. 1 is a graph depicting the first derivative of the oxygen concentration as a function of time.

An example of the dynamic response obtained is illustrated diagrammatically in FIG. 1, which shows, plotted on the y-axis, the first derivative of the oxygen concentration (in mol/m$^3$/s) and, plotted on the x-axis, the time (in seconds).

When the adsorption capacity of the zeolite increases linearly with the pressure to which the adsorption zone and therefore the adsorbent is subjected, it may be shown that the parameter $a_k$ satisfies the following equation:

$$a_k = \frac{2\mu}{\sigma^2} \tag{2}$$

where $\mu$ represents the mean output time of the adsorption front and $\sigma$ represents the time width of the adsorption front.

In order to obtain a breakthrough curve, particular temperature, pressure and nitrogen concentration conditions must apply so that Equation (2) is met, this being done for the purpose of simply evaluating the parameter $a_k$: more specifically, an initial nitrogen/oxygen mixture comprising less than 10% by volume of nitrogen is chosen. Moreover, the pressure within the adsorption zone is set at a value of less than $2\times10^5$ Pa (2 bar), while checking that it falls within the linearity range of the curve representing the variation in adsorption capacity as a function of pressure. These conditions are easily determined by experts.

The operating protocol followed for plotting the breakthrough curve is, for example, as follows.

Injected (at a constant flow rate) at one of the ends of the adsorption zone, initially in equilibrium with pure oxygen, is a mixture of nitrogen and oxygen. Initially, all the nitrogen contained in the mixture is adsorbed on the adsorbent, pure oxygen being recovered at the outlet of the adsorption zone. In the adsorption zone, the adsorbent lying at the inlet of the zone captures the nitrogen molecules of the $O_2/N_2$ mixture first. During this time, the adsorbent near the outlet of the adsorption zone, being exclusively in contact with a stream of oxygen, remains intact. The zone where molecular transfer between the adsorbent and the gas phase takes place is usually called the adsorption front. This gradually advances along the adsorption zone by adsorption of the nitrogen molecules from the mixture to be separated.

It will be understood that, once the adsorption front has reached the end of the adsorption zone, the gas recovered at the outlet of the zone contains nitrogen in addition to the expected oxygen, insofar as the entire bed of adsorbent contained in the adsorption zone is saturated.

Because of the existence of molecular diffusion mechanisms and of the heterogeneity of the zeolite agglomerates, saturation of the adsorbent does not take place uniformly in the direction of advance of the gas mixture within the adsorption zone. Thus, when the gas mixture reaches the end of the adsorption zone, the nitrogen concentration in the mixture recovered at the outlet gradually increases.

The breakthrough curve represents the variation in the oxygen concentration at the outlet of the adsorption zone as a function of time, time zero corresponding to the precise instant at which the adsorption phase is initiated. This curve is defined by the equation c=f(t), where c represents the oxygen concentration in the gas mixture recovered at the outlet, t is the time variable and f is the function describing the variations in the concentration c as a function of time t.

In order to determine the parameter $a_k$, the breakthrough curve has to be recorded. This is done, in a manner known per se, simply by measuring the oxygen concentration in the gas mixture recovered at the outlet of the adsorption zone at various times.

The mean output time $\mu$ of the front is calculated from the breakthrough curve f(t) using Equation (3) below:

$$\mu = \frac{\int_0^\infty t \cdot f'(t) \cdot dt}{\int_0^\infty f'(t) \cdot dt} \quad (3)$$

where f'(t) represents the derivative of the function f(t) defined above; an example of the derivative f'(t) being shown diagrammatically in FIG. 1.

Likewise, the time width of the front satisfies the following Equation (4):

$$\sigma^2 = \frac{\int_0^\infty (t-\mu)^2 \cdot f'(t) \cdot dt}{\int_0^\infty f'(t) \cdot dt} \quad (4)$$

where f'(t) also corresponds to the derivative of the function f(t).

The parameter $a_k$ is then defined by Equation (2) given above and is thus easily determined from the values of $\mu$ and $\sigma$ calculated in this way.

In practice, a column 127 cm in length and 4.5 cm in diameter is used, the flow rate of the feed gas mixture (98% $O_2$+2% $N_2$) is 2.36 $m^3/h$, the absolute pressure is $1.5 \times 10^5$ Pa, and the temperature is 20° C., and an analyser having a time response of less than 0.5 s is used.

It is therefore apparent, from Equation (1) above, that to improve the kinetics of the molecular sieve, it is possible either to increase the coefficient k, which depends on the properties of the pore network and on the adsorption isotherm for the gas in question, such as nitrogen, or to reduce the diameter d.

Now, as explained above, reducing the diameter d of the adsorbent particles reduces the intrinsic strength of the adsorbent particles.

Figure 2:
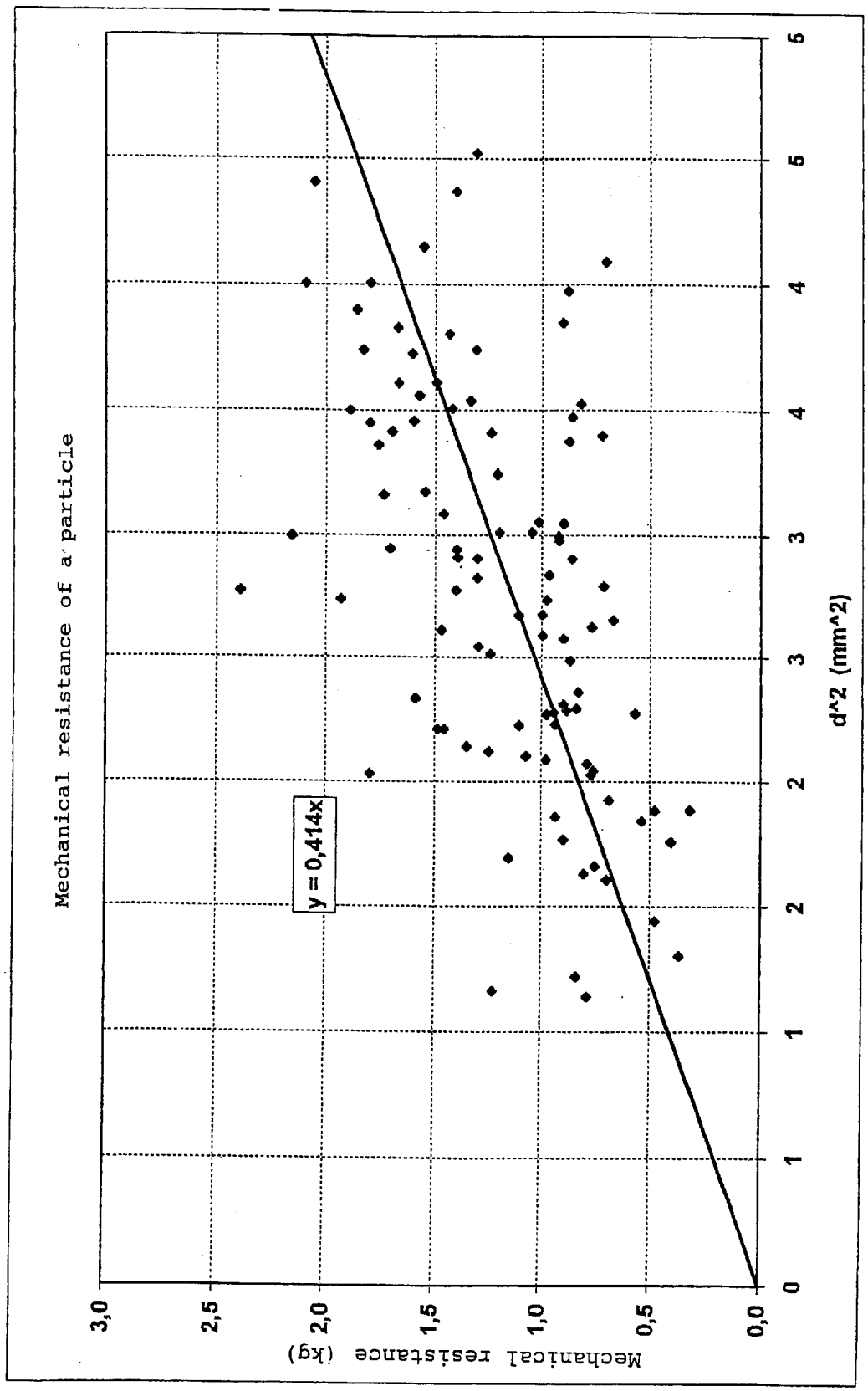
FIG. 2 shows the mechanical strength of the particles of an adsorbent as a functLon of the square of the diameter of the particles.

This is, moreover, clearly apparent from the appended FIG. 2 which shows the mechanical strength (in kg) of the particles of an adsorbent, plotted on the y-axis, as a function of the square of the diameter (d) of the particles (in $mm^2$).

To do this, the compressive strength of the particles or balls of adsorbents was measured according to the measurement procedure explained below.

The mechanical strength of the particles or balls of adsorbent is measured with the aid of a mechanical tester of the ADAMEL-LHOMARGY MTS 2/M type using a force sensor with a full scale of 100 newtons. The accuracy of this sensor is ±0.5% between 2 and 100% of full scale. The test is carried out on 25 balls taken at random from the combination or specimen of balls to be analysed. To do this, approximately 1 gram of balls is deposited in a paper sheet folded in 2, that is to say in the form of a "V", so that the balls are aligned automatically in the channel thus formed. The first 25 non-broken balls are selected. They are stored in a closed container so that their mechanical properties are not affected by the ambient humidity. Next, these 25 balls Eire placed, one by one, at the centre of the platen of the mechanical tester and subjected to an increasing force until they break. The adjusted parameters on the mechanical tester are the rate of preloading (here, 30 mm/minute ±0.1%), the preload limit (here, 0.02 N) and the testing rate (here, 10 mm/minute ±0.1%). Furthermore, the maximum force (in N) supported by the ball before fracture is directly provided by the mechanical tester. This force will be regarded as the mechanical strength of the ball. For a given specimen, the compressive strength will be regarded as the mean value obtained from the 25 balls taken from random, as described above. This value will be given in kilograms (daN).

Measurements have been carried out in this way and clearly show that the smaller the diameter of the particles the lower their mechanical strength.

Based on these measurements, it has been possible to determine the Equation (5), plotted in FIG. 2 appended hereto, which connects the mechanical strength (MS), the intrinsic strength ($\alpha$) and the diameter (d) of the particles, namely the equation:

$$MS = \alpha d^2 \quad (5)$$

where:

MS is expressed in kg;

$\alpha$ is expressed in $kg/mm^2$ with, here, $\alpha$=0.414; and d is expressed in m.

It follows that, given that any reduction in the particle size has a negative impact on the mechanical strength, in order to be able to reduce the size of the particles without excessively reducing their intrinsic strength, it is necessary for the intrinsic strength $\alpha$ of the adsorbent particles to have a high enough value, of at least 0.1 and preferably of at least 0.2.

Moreover, as Examples A to E given in the table below show, there is, surprisingly, a connection between the intrinsic strength parameter $\alpha$ and the intrinsic kinetics parameter k.

TABLE

| Example No. | Particle size Diameter (d) (mm) | Compression MS (kg) | Compression $\alpha$ = $MS/d^2$ ($kg/mm^2$) | Kinetics $a_k$ (1/s) | Kinetics k = $a_k \cdot d^2$ ($mm^2/s$) |
|---|---|---|---|---|---|
| A | 1.48 | 0.08 | 0.03 | >4 | >4 |
| B | 2.50 | 0.19 | 0.03 | 1.99 | 12.4 |
| C | 2.54 | 0.29 | 0.05 | 1.34 | 8.6 |
| D | 1.42 | 1.15 | 0.57 | 0.88 | 1.8 |
| E | 1.81 | 1.92 | 0.58 | 0.53 | 1.7 |

It may be seen that a higher intrinsic strength parameter $\alpha$ corresponds to a lower intrinsic kinetic parameter k.

In other words, increasing the intrinsic strength of the particles leads to a reduction in their intrinsic kinetics.

Consequently, in order to obtain acceptable performance from the industrial standpoint, it is desirable for the intrinsic strength $\alpha$ of the adsorbent particles not to be too high, for example less than 2 and preferably less than 1.

The present invention is not limited to the field of the production of oxygen from air and can therefore, consequently, be applied to the separation of other gas streams, especially such as streams containing hydrogen, carbon dioxide and/or carbon monoxide, and in particular to the purification of synthesis gas or "syngag".

What is claimed is:

1. PSA process for separating a stream of gas containing at least one first compound which is preferentially adsorbed on at least one adsorbent and at least one second compound which is adsorbed less preferentially on said adsorbent than said first compound, in which process said adsorbent comprises at least particles of a zeolite having a Si/Al ratio of less than or equal to 5 and chosen from X, Y or A zeolites; said zeolite having a kinetics coefficient ($a_k$) and an intrinsic strength ($\alpha$), with: $a_k > 0.5$ s$^{-1}$ and $0.10 < \alpha < 2$.

2. The process according to claim 1 wherein the intrinsic strength ($\alpha$) is greater than 0.15.

3. The process according to claim 2 wherein the intrinsic strength ($\alpha$) is greater than 0.20.

4. The p)rocess according to claim 1, wherein the intrinsic strength ($\alpha$) is less than 1.5.

5. The process according to claim 4, wherein the intrinsic strength ($\alpha$) is less than 1.

6. The process according to claim 1, wherein the zeolite is a zeolite having a faujasite structure with a Si/Al ratio of 1 to 1.25.

7. The process according to claim 1, wherein the zeolite is a LiSX zeolite with a Si/Al ratio of about 1.02±0.02.

8. The process according to claim 1, wherein the zeolite is exchanged by at least one of monovalent, divalent and trivalent cations.

9. The process according to claim 1, wherein the zeolite is exchanged with lithium, potassium, calcium, zinc, copper, aluminum, strontium or nickel cations.

10. The process according to claim 1, wherein the zeolite contains from 50 to 99% of at least one of lithium and calcium cations.

11. The process according claim 1, wherein the stream of gas to be separated comprises oxygen and nitrogen.

12. The process according to claim 1, wherein the stream of gas to be separated is a stream of air, the first compound is nitrogen and the second compound is oxygen.

13. The process according claim 1, wherein the stream of gas to be separated comprises at least one first gaseous compound selected from the group consisting of carbon monoxide, carbon dioxide, hydrogen and mixtures thereof; and at least one second gaseous compound more polar than hydrogen.

14. The process according claim 1, wherein the process is a vacuum swing adsorption process.

15. Adsorbent for the separation of gases, comprising at least particles of a zeolite having a Si/Al ratio of less than or equal to a, and selected from X zeolites and A zeolites; said zeolite having a kinetics coefficient ($a_k$) and an intrinsic strength ($\alpha$), with: $a_k < 0.5$ s$^{-1}$ and $0.10 < \alpha < 2$.

16. The adsorbent according to claim 15, wherein the kinetics coefficient and the intrinsic strength are such that $0.20 < \alpha < 1$.

* * * * *